United States Patent
Cotner et al.

(10) Patent No.: US 6,931,630 B1
(45) Date of Patent: Aug. 16, 2005

(54) METHOD OF, SYSTEM FOR, AND COMPUTER PROGRAM PRODUCT FOR PROVIDING AUTOMATIC IDENTIFICATION OF A COMPUTER PROGRAM CODE CANDIDATE FOR WEB DEPLOYMENT OR A STORED PROCEDURE

(75) Inventors: Curt L. Cotner, Gilroy, CA (US); Laurence E. England, Morgan Hill, CA (US); Howard J. Glaser, San Jose, CA (US); Howard M. Hess, Winnetka, IL (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 09/672,172

(22) Filed: Sep. 27, 2000

(51) Int. Cl.[7] ............................. G06F 9/44; G06F 9/45
(52) U.S. Cl. ...................... 717/126; 717/131; 717/141
(58) Field of Search ................................. 717/127, 131

(56) References Cited

U.S. PATENT DOCUMENTS

| | | | |
|---|---|---|---|
| 4,931,928 A | * 6/1990 | Greenfeld .................... 717/131 |
| 5,313,616 A | * 5/1994 | Cline et al. .................. 717/127 |
| 5,553,234 A | 9/1996 | Cotner et al. .......... 395/182.14 |
| 5,572,673 A | 11/1996 | Shurts ........................ 395/186 |
| 5,615,337 A | 3/1997 | Zimowski et al. ..... 395/200.01 |
| 5,632,015 A | 5/1997 | Zimowski et al. ..... 395/200.01 |
| 5,657,447 A | 8/1997 | Leung et al. ............... 395/601 |
| 5,689,633 A | 11/1997 | Cotner et al. .......... 395/182.14 |
| 5,742,810 A | 4/1998 | Ng et al. .................... 395/604 |
| 5,768,589 A | 6/1998 | Bradley et al. ............. 395/684 |
| 5,794,231 A | 8/1998 | Li et al. ......................... 707/2 |
| 5,862,378 A | 1/1999 | Wang et al. ................. 395/701 |
| 5,875,332 A | 2/1999 | Wang et al. ................. 395/702 |
| 5,884,312 A | 3/1999 | Dustan et al. ................ 707/10 |
| 5,909,577 A | * 6/1999 | Devanbu ..................... 717/127 |
| 5,966,715 A | 10/1999 | Sweeney et al. ............ 707/203 |
| 5,978,580 A | 11/1999 | Wang et al. ................. 395/701 |
| 6,006,235 A | 12/1999 | Macdonald et al. ........ 707/103 |
| 6,009,271 A | * 12/1999 | Whatley ...................... 717/127 |
| 6,041,327 A | 3/2000 | Glitho et al. ................. 707/10 |
| 6,067,414 A | 5/2000 | Wang et al. ................. 395/702 |

FOREIGN PATENT DOCUMENTS

| WO | WO 99/08206 | 2/1999 | ........... G06F/17/30 |
|---|---|---|---|
| WO | WO 99/32998 | 7/1999 | ........... G06F/17/30 |
| WO | WO 00/43916 | 7/2000 | ........... G06F/17/30 |

* cited by examiner

*Primary Examiner*—Wei Y. Zhen
*Assistant Examiner*—Eric B. Kiss
(74) *Attorney, Agent, or Firm*—Prentiss W. Johnson (57) ABSTRACT

Computer program code which is a candidate for Web enablement or stored procedures is identified. Source code corresponding to computer program code is scanned and parsed to determine static information concerning the computer program code. The static information is stored in a database. Dynamic information concerning the computer program code during an execution of the computer program code is also collected and stored in the database. Responsive to the static information and dynamic information stored in the database, relationships and dependencies are then developed and stored in the database. The database may then be queried to produce a set of potential candidates of computer program code meeting a constraint of the query. If insufficient candidates are returned by the query, then the query constraint may be relaxed, and the query repeated.

21 Claims, 6 Drawing Sheets

METHOD OF, SYSTEM FOR, AND COMPUTER PROGRAM PRODUCT FOR PROVIDING AUTOMATIC IDENTIFICATION OF A COMPUTER PROGRAM CODE CANDIDATE FOR WEB DEPLOYMENT OR A STORED PROCEDURE

BACKGROUND OF THE INVENTION

1. Field of the Invention

The present invention relates in general to software re-engineering, and more particularly to identifying computer program code which is a candidate for Web enablement or stored procedures.

2. Description of the Related Art

A large enterprise may have a significant volume of computer application code, the enterprise's code inventory. Yet the enterprise's programming skill base to maintain, manage, enhance, or re-implement that code inventory may be dwindling. Relative to re implementation, not all application programs are candidates for conversion to a Web interface or a database stored procedure. Many, if not most, applications do not possess the necessary characteristics for such a conversion. Discovering those existing opportunities to easily access a function from the Web or convert a function to a database stored procedure may be difficult due to the labor intensive nature of the conventional manual techniques. Conventional methods have failed to provide adequate solutions to these problems. Thus, there is a clearly felt need for a method of, system for, article of manufacture for, and computer program product for identifying computer program code which is a candidate for Web enablement or stored procedures.

SUMMARY OF THE INVENTION

The present invention comprises a method, system, computer program product, and article of manufacture for identifying computer program code which is a candidate for Web enablement or stored procedures. Source code corresponding to computer program code is scanned and parsed to determine static information concerning the computer program code. The static information is stored in a database. Dynamic information concerning the computer program code during an execution of the computer program code is also collected and stored in the database. Responsive to the static information and dynamic information stored in the database, relationships and dependencies are then developed and stored in the database. The database may then be queried to produce a set of potential candidates of computer program code meeting a constraint of the query. If insufficient candidates are returned by the query, then the query constraint may be relaxed, and the query repeated.

A candidate for re-implementation as a database stored procedure call may be identified by a query searching the database for a portion of the computer program code having static information indicating that the portion of the computer program code contains a number, above a specified first threshold, of calls to a database management system, and having dynamic information indicating that the portion of the computer program code is subject to a number of calls, above a specified second threshold, by another portion of computer program code.

A candidate for re-implementation as a Web-enabling interface call may be identified by a query searching the database for a portion of the computer program code having static information indicating that the portion of the computer program contains a transaction and does not contain screen output related program code.

The placement of this information capture, classification, and relationship/dependency discovery into a database, the Application Knowledge Base, that can be queried may provide significant advantages to a user. For an enterprise, this process may be performed across the entire enterprise, encompassing all of the enterprise's inventory of application programs. The details of the enterprise's application program inventory may be saved and queried in the application knowledge base. These details may include system and sub-system specific information. In addition to queries for identification of candidate computer code, the application knowledge base may simply be queried for application characteristics.

Unlike simple conventional string matching or pattern matching approaches, the present invention discovers relationships and dependencies within the computer program code. For example, a COBOL dynamic CALL holding the called routine's name in a variable may be analyzed by data flow analysis to determine the potential values of the target called routine. Dynamic information obtained during the execution of the COBOL dynamic CALL may augment the static information obtained through the static analysis and data flow analysis.

One aspect of a preferred embodiment of the present invention identifies computer program code which is a candidate meeting a query constraint.

Another aspect of a preferred embodiment of the present invention identifies computer program code which is a candidate for a stored procedure.

Another aspect of a preferred embodiment of the present invention identifies computer program code which is a candidate for Web enablement.

Another aspect of a preferred embodiment of the present invention scans and parses source code corresponding to computer program code to determine static information concerning the computer program code, and stores the static information in a database.

Another aspect of a preferred embodiment of the present invention collects dynamic information concerning the computer program code during an execution of the computer program code, and stores the dynamic information in the database.

Another aspect of a preferred embodiment of the present invention discovers or develops relationships and dependencies responsive to the static information and dynamic information stored in the database, and stores the relationships and dependencies in the database.

Another aspect of a preferred embodiment of the present invention queries the database to produce a set of potential candidates of computer program code meeting a constraint of the query. If insufficient candidates are returned by the query, then the query constraint may be relaxed, and the query repeated.

Another aspect of a preferred embodiment of the present invention identifies a candidate for re-implementation as a database stored procedure call by a query searching the database for a portion of the computer program code having static information indicating that It the portion of the computer program code contains a number, above a specified first threshold, of calls to a database management system, and having dynamic information indicating that the portion of the computer program code is subject to a number of calls, above a specified second threshold, by another portion of computer program code.

Another aspect of a preferred embodiment of the present invention identifies a candidate for re-implementation as a Web-enabling interface call by a query searching the database for a portion of the computer program code having static information indicating that the portion of the computer program contains a transaction and does not contain screen output related program code.

A preferred embodiment of the present invention has the advantage of promoting reuse of an existing application program's business logic, resources, or other assets.

A preferred embodiment of the present invention has the advantage of promoting impact analysis and application understanding of an existing application program.

A preferred embodiment of the present invention has the further advantage of promoting reuse of an existing application program's business logic to link the existing business logic with the Web via a connector to form a new Web application program.

A preferred embodiment of the present invention has the further advantage of providing improved analysis, identification, and isolation of the business logic of an application program.

A preferred embodiment of the present invention has the further advantage of reducing or eliminating labor intensive efforts in the creation of a Web connector through the analysis, identification, and isolation of the business logic.

A preferred embodiment of the present invention has the further advantage of promoting the use of an enterprise's existing programming skills.

A preferred embodiment of the present invention has the further advantage of providing an application knowledge base, a database containing static information, dynamic information, and relationships and dependencies of computer program code, which may be queried to identify candidate computer program code.

A preferred embodiment of the present invention has the further advantage of providing identification of computer program code which is a candidate for stored procedures.

A preferred embodiment of the present invention has the further advantage of providing identification of computer program code which is a candidate for Web enablement.

A preferred embodiment of the present invention has the further advantage of providing an improved user interface for identification of computer program code which is a candidate for Web enablement or stored procedures.

A preferred embodiment of the present invention has the further advantage of providing improved usability in a tool for identification of computer program code which is a candidate for Web enablement or stored procedures.

A preferred embodiment of the present invention has the further advantage of providing improved functionality in a tool for identification of computer program code which is a candidate for Web enablement or stored procedures.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
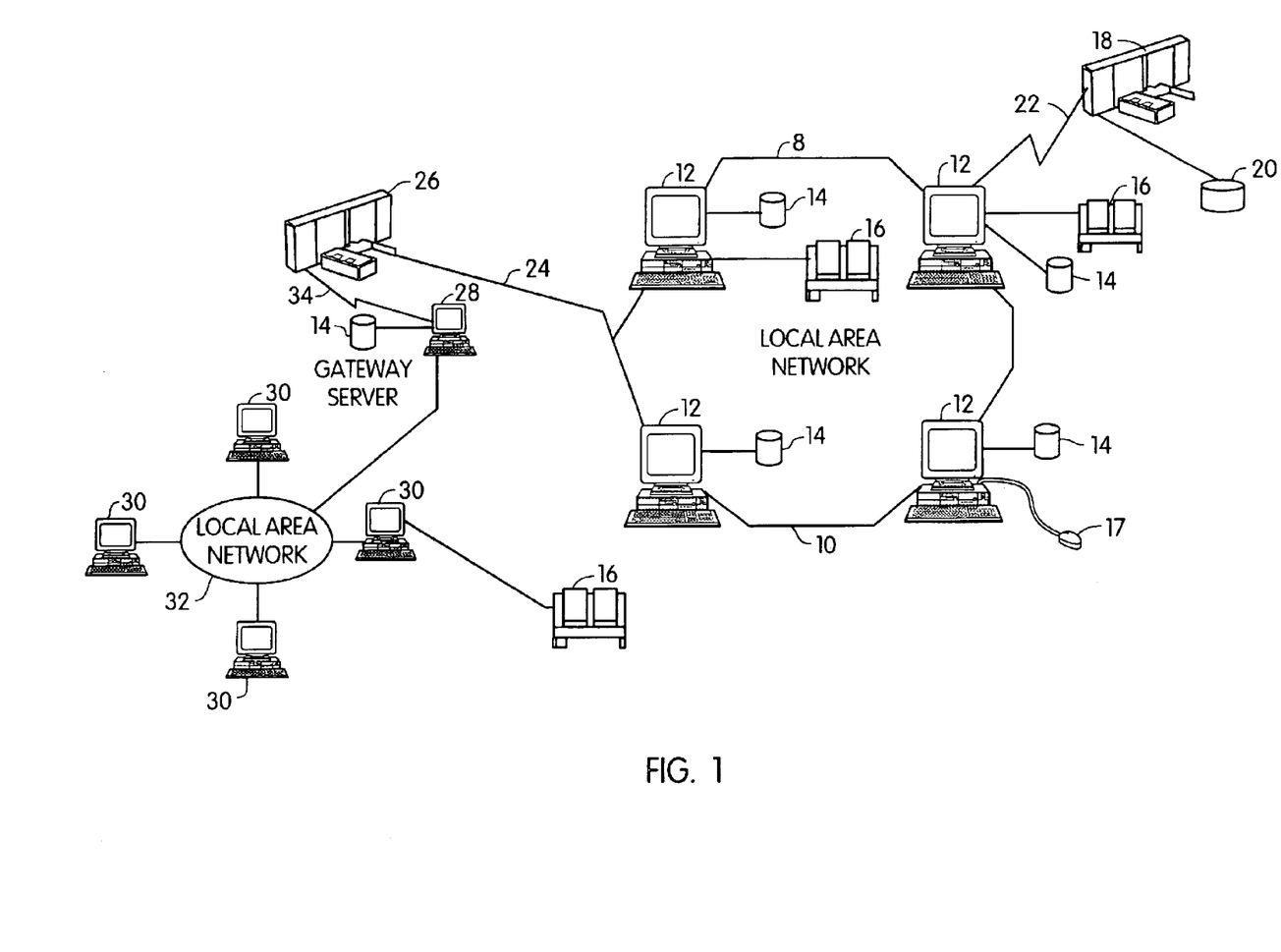
FIG. 1 is a block diagram of a distributed computer system used in performing the method of the present invention, forming part of the apparatus and computer program product of the present invention, and which may use the article of manufacture and computer program product comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Alternatively, networks 10 and 32 may be intranets or portions of the internet. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 may be an IWS which serves to link LAN 32 to LAN 10. Preferably, server 28 is a web application server which passes transactions from a requester 30 on the internet 32 to the mainframe 18 upon which a back-end application serving the transaction is executing.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to link an application program on the mainframe 18 to the internet 32 and/or World Wide Web (Web), where the application program was not originally designed for Web or internet based transactions. For such Web-enablement, the user needs to identify call interfaces of the application program which conventionally is a manual process. If this application program has a database dependency, then it may also be desirable for this user to identify call interfaces or computer program code which may be re-implemented as a database stored procedure call. A preferred embodiment of the present invention assists a user in performing such an identification of computer program code which is a candidate for a particular purpose, such as re-implementation. Alternative embodiments identify candidates for re-implementation such as Web enablement or a stored procedure.

Figure 2:
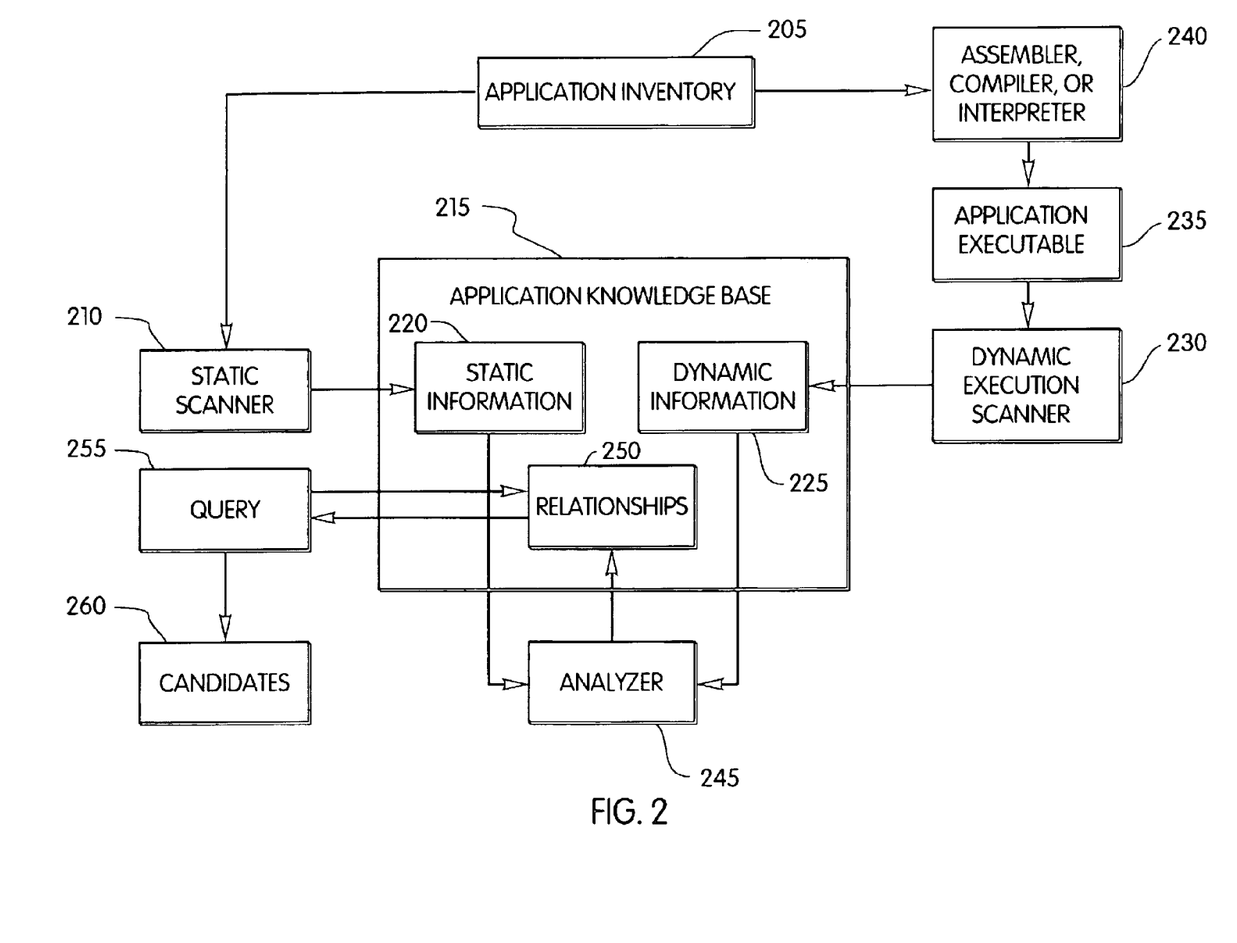
FIG. 2 is a block diagram of a preferred embodiment of the present invention.

Referring now to FIG. 2 illustrating a block diagram of a preferred embodiment of the present invention, the preferred embodiment comprises a database 215 (Application Knowledge Base) for storing static information 220, dynamic information 225, and relationships and dependencies 250 corresponding to computer code in application inventory 205. The database in the preferred embodiment is an IBM® DDB2® UDB (Universal Database); however, other relational or non-relational (object, network, hierarchal, flat, . . . ) databases may be used in addition to either persistent or in memory databases without departing from the spirit and scope of the present invention. (IBM® and DB2® are registered trademarks of International Business Machines Corporation in the United States, other countries, or both.) The static information 220 concerning the computer program code 205 is determined by a scanner, parser, or other software analysis tool 210. An execution monitor or scanner 230 collects dynamic information 225 concerning the computer program code 205 during an execution 235 of the computer program code. The static information 220 and the dynamic information 225 are analyzed by an relationship analyzer 245 to discover and/or develop relationships and dependencies 250 responsive to the static information 220 and dynamic information 225. A query 255 of the Application Knowledge Base 215 may then produce a set of potential candidates 260 of computer program code meeting a constraint of the query. The query facility of the preferred embodiment is IBM net.Data, a dynamic HTML (HyperText Markup Language) page generator; however, other query facilities may be used such as a Java servlet or a Java data bean. (Java and all Java-based trademarks are trademarks of Sun Microsystems, Inc. in the United States, other countries, or both.)

Figure 3:
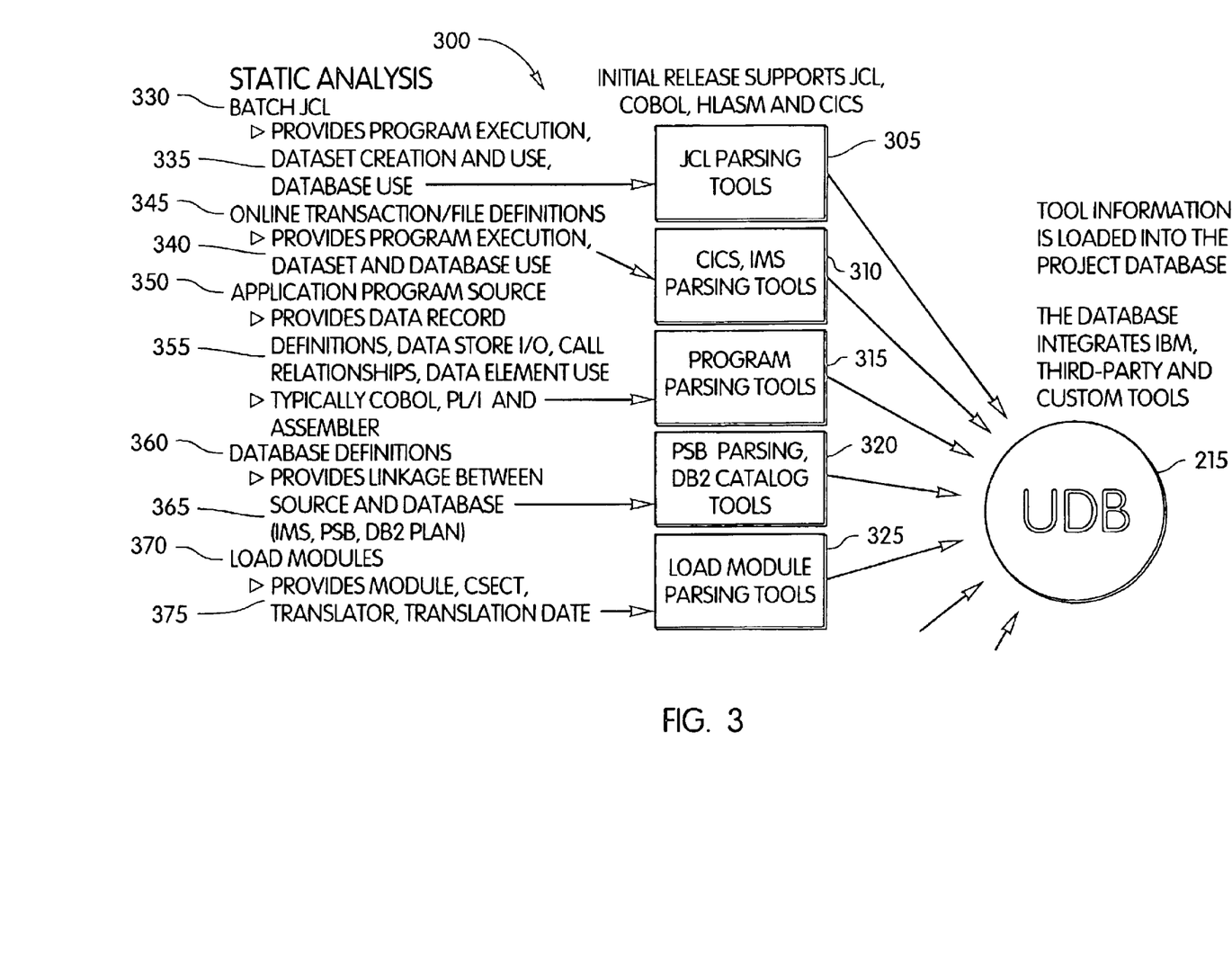
FIG. 3 illustrates a preferred embodiment of the static scanner or parser portion of the preferred embodiment of the present invention.

FIG. 3 illustrates a preferred embodiment 300 of the static scanner, parser, or other analysis tool 210 which collects the static information 220 concerning the computer program code 205. The static scanner 300 may comprise multiple static analysis tools. In the preferred embodiment, the static scanner 300 comprises a control/environment parsing tool 305, a transaction parsing tool 310, a program source parsing tool 315, a database parsing tool 320, and an executable load module parsing tool 325. The preferred control/environment parsing tool 305 is a JCL (Job Control Language) parsing tool which analyzes JCL 330 to provide program execution, dataset creation and use, and database use 335. An IBM Customer Information Control System (CICS®) parsing tool and an IBM Information Management System (IMS) parsing tool are preferred transaction parsing tools 310 providing program execution, dataset and database use 340 from analyzing transaction definitions and file definitions 345. (CICS® is a registered trademark of International Business Machines Corporation in the United States, other countries, or both.) Application program source 350 may be analyzed by the program source parsing tool 315 to provide data record definitions, data store I/O, call relationships, and data element use 355. A database parsing tool for IMS DBD (Data Base Definition) and IMS PSB (Program Specification Block) and a database parsing tool to analyze DB2 table information are preferred for the database parsing tool 320 which analyzes database definitions 360 to provide linkages 365 between the application program source and databases such as IMS, PSB, and DB2 among others. The executable/load module parsing tool 325 analyzes load modules 370 to provide module, CSECT (control section), translator, and translation date 375.

Figure 4:
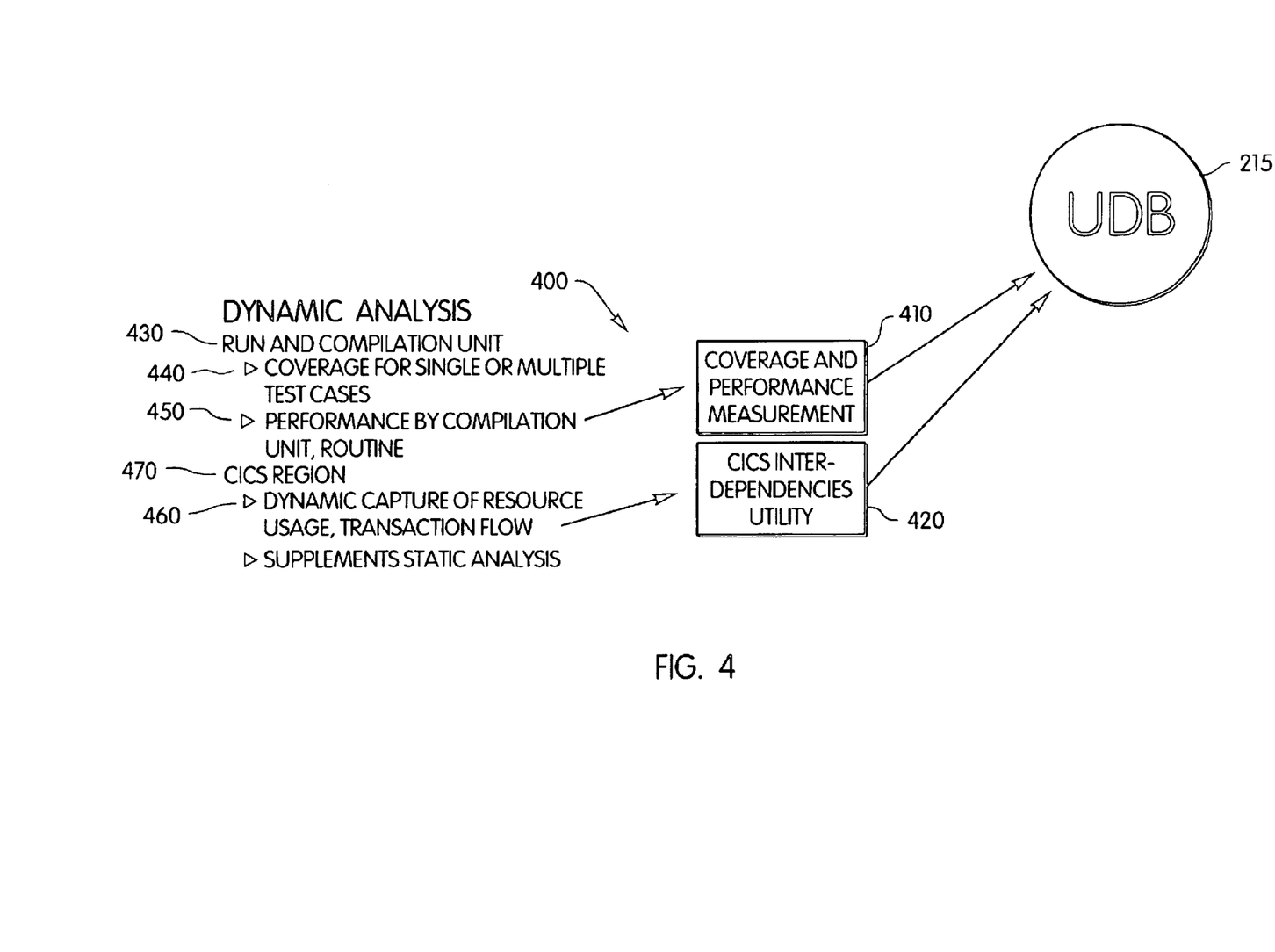
FIG. 4 illustrates a preferred embodiment of the dynamic scanner or execution monitor parser portion of the preferred embodiment of the present invention.

FIG. 4 illustrates a preferred embodiment 400 of the execution monitor or dynamic scanner 230 which collects dynamic information 225 concerning the computer program code 205 during an execution 235 of the computer program code. The dynamic scanner 400 may also comprise multiple dynamic analysis tools, comprising in the preferred embodiment a coverage and performance measurement tool 410 and an inter-dependency tool 420. The coverage and performance measurement tool 410 analyzes the execution 430 of an application program run unit and compilation unit to determine the coverage for single or multiple test cases 440 and to measure performance 450. A preferred inter-dependency tool 420 is a CICS Inter-dependencies Utility which dynamically captures resource usage, transaction flow 460 from a CICS region 470. The execution monitor in the preferred embodiment is an IBM CICS Affinities Utility and the IBM CICS Interdependency Utility; however, those skilled in the art will recognize other execution monitors may be used without departing from the spirit and scope of the invention.

Figure 5:
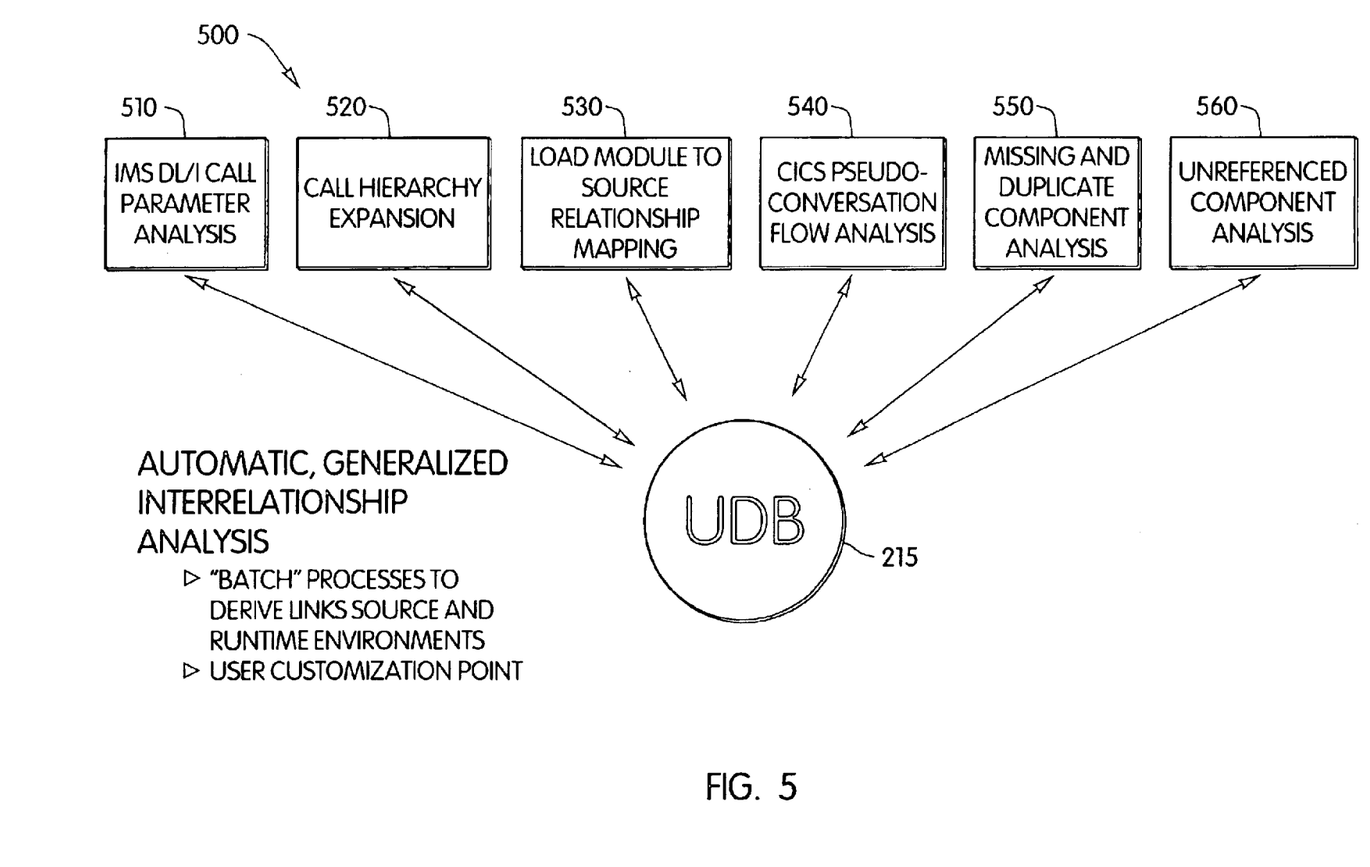
FIG. 5 illustrates a preferred embodiment of the relationship analyzer portion of the preferred embodiment of the present invention.

FIG. 5 illustrates a preferred embodiment 500 of the relationship analyzer 245 which discovers and/or develops relationships and dependencies 250 responsive to the static information 220 and dynamic information 225. In the preferred embodiment, the relationship analyzer 500 provides automatic, generalized, inter-relationship analysis by performing IMS DL/I (Information Management System Data Language I) call parameter analysis 510, call hierarchy expansion 520, load module to source relationship mapping 530, CICS pseudo-conversation flow analysis 540, missing and duplicate component analysis 550, and un-referenced component analysis 560.

Figure 6:
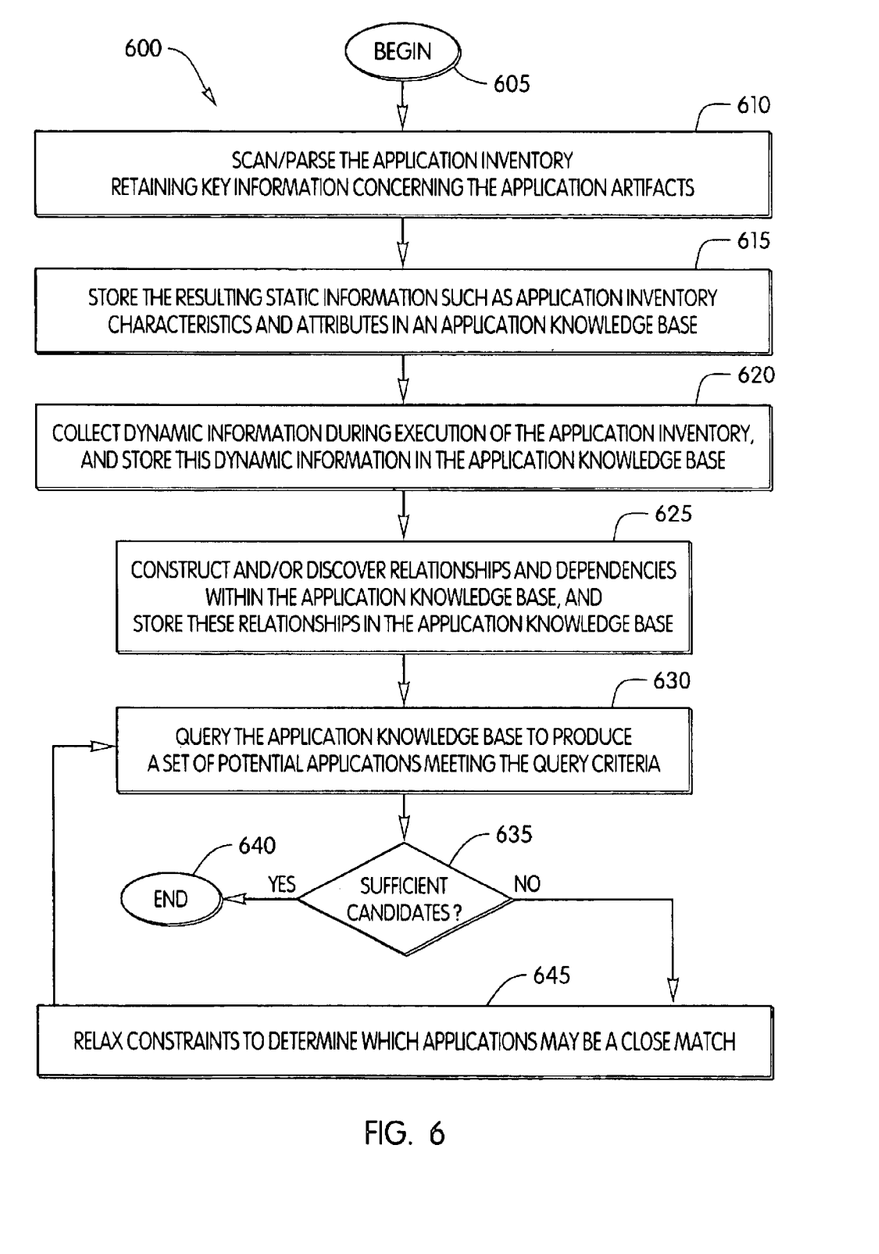
FIG. 6 is a flowchart illustrating the operations preferred in carrying out the preferred embodiment of the present invention.

Referring now to FIG. 6, the flowchart illustrates the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language. The process 600 of identifying computer program code which is a candidate for a particular purpose, such as re-implementation for Web enablement or stored procedures begins at process block 605. Process block 610 then uses static scanner 210 to scan or parse the application inventory 205 retaining static information 220 concerning the artifacts of the application program. Thereafter, process block 615 stores the static information 220 in the Application Knowledge Base 215. Process block 620 augments the Application Knowledge Base 215 with dynamic information 225 obtained by an execution scanner or monitor 230 which collects the dynamic information 225 during the execution of an application program executable 235 produced by an assembler, compiler, or interpreter 240 from the computer program source code. After collection of the static information 220 and dynamic information 225, process block 625 uses relationship analyzer 245 to discover and develop relationships and dependencies 250 within the Application Knowledge Base 215, and then stores these relationships and dependencies 250 in the Application Knowledge Base 215. Thereafter, process block 630 may query 255 the application knowledge base 215 to produce a set of potential candidates 260 of computer program code meeting a constraint of the query.

For example, to determine which applications may benefit by being re-implemented as a database stored procedure, the query may search for routines containing SQL (Structured Query Language) statements that are the targets of a number of CALLs where the number is above a specified threshold. Thus the present invention provides a capability of identifying more likely candidates as opposed to the conventional manual process of looking for routines that contain a large amount of SQL. To determine which application programs are candidates for a Web interface under CICS, the query may search for CICS transactions that contain a COMMAREA (communication area) linkage and that are void of BMS (Basic Mapping Support) MAP send and/or receive statements (i.e., that lack screen I/O (input output)).

After the results of the query are returned, decision block 635 determines if sufficient candidates are identified and returned. If a sufficient number of candidates are not discovered, then process block 645 allows relaxing the query constraints, after which control returns to process block 630 to query the application knowledge base 215 with the relaxed constraints.

Returning now to decision block 635, if sufficient candidates are identified, the process may end at process block 640.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. A method of identifying a portion of computer program code as a candidate for a modification, said method comprising:

scanning and parsing source code corresponding to the computer program code to determine static information concerning the computer program code;

storing the static information in a database;

collecting dynamic information concerning the computer program code during an execution of the computer program code;

storing the dynamic information in the database;

developing relationships and dependencies responsive to the static information and dynamic information stored in database;

storing the relationships and dependencies in the database; and providing for a query of the database to produce a set of potential candidates of computer program code meeting a constraint of the query, wherein the query identifies a portion of the computer program code as a candidate for re-implementation as a Web-enabling interface call.

2. The method of claim 1 wherein if insufficient candidates are returned by the query, then providing for a relaxing of the constraint, and a repetition of the query.

3. The method of claim 2 further comprising the step of identifying a portion of the computer program code as a canidate for re-implementation as a database stored procedure call.

4. The method of claim 1 wherein the query searches the database for a portion of the computer program code having static information indicating that the portion of the computer program code contains a transaction call.

5. The method of claim 4 wherein the query also searches the database for a portion of the computer program code having static information indicating that the portion of the computer program does not contain screen output related program code.

6. A method of identifying a portion of computer program code as a candidate for a modification, said method comprising:

scanning and parsing source code corresponding to the computer program code to determine static information concerning the computer program code;

storing the static information in a database;

collecting dynamic information concerning the computer program code during an execution of the computer program code;

storing the dynamic information in the database;

developing relationships and dependencies responsive to the static information and dynamic information stored in database;

storing the relationships and dependencies in the database;

providing for a query of the database to produce a set of potential candidates of computer program code meeting a constraint of the query, wherein the query searches the database for a portion of the computer program code having static information indicating that the portion of the computer program code contains a call to a database management system, and having dynamic information indicating that the portion of the computer program code is subject to a call by another portion of computer program code;

if insufficient candidates are returned by the query, then providing for a relaxing of the constraint, and a repetition of the query; and identifying a portion of the computer program code as a candidate for re-implementation as a database stored procedure call.

7. The method of claim 6 wherein the query searches the database for a portion of the computer program code having static information indicating that the portion of the computer program code contains a number, above a specified first threshold, of calls to a database management system, and having dynamic information indicating that the portion of the computer program code is subject to a number of calls, above a specified second threshold, by another portion of computer program code.

8. An article of manufacture for use in a computer system for identifying a portion of computer program code as a candidate for a modification, said article of manufacture comprising a computer-readable storage medium having a computer program embodied in said medium which causes the computer system to execute a method:

scanning and parsing source code corresponding to the computer program code to determine static information concerning the computer program code;

storing the static information in a database;

collecting dynamic information concerning the computer program code during an execution of the computer program code;

storing the dynamic information in the database;

developing relationships and dependencies responsive to the static information and dynamic information stored in database;

storing the relationships and dependencies in the database; and providing for a query of the database to produce a set of potential candidates of computer program code meeting a constraint of the query, wherein the query identifies a portion of the computer program code as a candidate for re-implementation as a Web-enabling interface call.

9. The article of manufacture of claim 8 wherein if insufficient candidates are returned by the query, then providing for a relaxing of the constraint, and a repetition of the query.

10. The article of manufacture of claim 9 wherein the embodied computer program causes the computer system to execute the method step of identifying a portion of the computer program code as a candidate for re-implementation as a database stored procedure call.

11. The article of manufacture of claim 8 wherein the query searches the database for a portion of the computer program code having static information indicating that the portion of the computer program code contains a transaction call.

12. The article of manufacture of claim 11 wherein the query also searches the database for a portion of the computer program code having static information indicating that the portion of the computer program does not contain screen output related program code.

13. An article of manufacture for use in a computer system for identifying a portion of computer program code as a candidate for a modification, said article of manufacture comprising a computer-readable storage medium having a computer program embodied in said medium which causes the computer system to execute a method comprising:

scanning and parsing source code corresponding to the computer program code to determine static information concerning the computer program code;

storing the static information in a database;

collecting dynamic information concerning the computer program code during an execution of the computer program code;

storing the dynamic information in the database;

developing relationships and dependencies responsive to the static information and dynamic information stored in database;

storing the relationships and dependencies in the database;

providing for a query of the database to produce a set of potential candidates of computer program code meeting a constraint of the query wherein the query searches the database for a portion of the computer program code having static information indicating that the portion of the computer program code contains a call to a database management system, and having dynamic information indicating that the portion of the computer program code is subject to a call by another portion of computer program code;

if insufficient candidates are returned by the query, then providing for a relaxing of the constraint, and a repetition of the query; and identifying a portion of the computer program code as a candidate for re-implementation as a database stored procedure call.

14. The article of manufacture of claim 13 wherein the query searches the database for a portion of the computer program code having static information indicating that the portion of the computer program code contains a number, above a specified first threshold, of calls to a database management system, and having dynamic information indicating that the portion of the computer program code is subject to a number of calls, above a specified second threshold, by another portion of computer program code.

15. A computer system for identifying a portion of computer program code as a candidate for a modification, said computer system comprising:

a parser for scanning and parsing source code corresponding to the computer program code to determine static information concerning the computer program code;

an execution monitor for collecting dynamic information concerning the computer program code during an execution of the computer program code;

relationships and dependencies developed responsive to the static information and dynamic information;

a database for storing the static information, the dynamic information, and the relationships and dependencies; and a query of the database to produce a set of potential candidates of computer program code meeting a constraint of the query, wherein the query identifies a portion of the computer program code as a candidate for re-implementation as a Web-enabling interface call.

16. The computer system of claim 15 wherein if insufficient candidates are returned by the query, then providing for a relaxing of the constraint, and a repetition of the query.

17. The computer system of claim 16 further comprising an identification of a portion of the computer program code as a candidate for re-implementation as a database stored procedure call.

18. The computer system of claim 15 wherein the query searches the database for a portion of the computer program code having static information indicating that the portion of the computer program code contains a transaction call.

19. The computer system of claim 18 wherein the query also searches the database for a portion of the computer program code having static information indicating that the portion of the computer program does not contain screen output related program code.

20. A computer system for identifying a portion of computer program code as a candidate for a modification, said computer system comprising:

a parser for scanning and parsing source code corresponding to the computer program code to determine static information concerning the computer program code;

an execution monitor for collecting dynamic information concerning the computer program code during an execution of the computer program code;

relationships and dependencies developed responsive to the static information and dynamic information;

a database for storing the static information, the dynamic information, and the relationships and dependencies; and a query of the database to produce a set of potential candidates of computer program code meeting a constraint of the query wherein the query searches the database for a portion of the computer program code having static information indicating that the portion of the computer program code contains a call to a database management system, and having dynamic information indicating that the portion of the computer program code is subject to a call by another portion of computer program code, and wherein if insufficient candidates are returned by the query, then providing for a relaxing of the constraint, and a repetition of the query; and a portion of the computer program code identified as a candidate for re-implementation as a database stored procedure call.

21. The computer system of claim 20 wherein the query searches the database for a portion of the computer program code having static information indicating that the portion of the computer program code contains a number, above a specified first threshold, of calls to a database management system, and having dynamic information indicating that the portion of the computer program code is subject to a number of calls, above a specified second threshold, by another portion of computer program code.

* * * * *